United States Patent
Choi et al.

(10) Patent No.: US 9,283,966 B2
(45) Date of Patent: Mar. 15, 2016

(54) MOBILE ROBOT HAVING FRICTION COEFFICIENT ESTIMATION FUNCTION AND FRICTION COEFFICIENT ESTIMATION METHOD

(71) Applicant: Samsung Electronics Co., Ltd., Suwon-Si, Gyeonggi-Do (KR)

(72) Inventors: Hyun Do Choi, Yongin-si (KR); Suk June Yoon, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/187,924

(22) Filed: Feb. 24, 2014

(65) Prior Publication Data

US 2015/0019103 A1 Jan. 15, 2015

(30) Foreign Application Priority Data

Jul. 9, 2013 (KR) ........................ 10-2013-0080147

(51) Int. Cl.
| | |
|---|---|
| *G06F 19/00* | (2011.01) |
| *B60W 40/068* | (2012.01) |
| *B60T 8/1763* | (2006.01) |
| *B60T 8/172* | (2006.01) |

(52) U.S. Cl.
CPC ............ *B60W 40/068* (2013.01); *B60T 8/172* (2013.01); *B60T 8/1763* (2013.01); *B60T 2210/12* (2013.01); *B60W 2550/148* (2013.01); *Y10S 901/01* (2013.01)

(58) Field of Classification Search
CPC ............... B60W 40/068; B60W 2550/148; B60T 8/1763; B60T 2210/12; Y10S 901/01
USPC ............... 701/82, 1, 80, 90–91; 700/245–264
See application file for complete search history.

(56) References Cited

U.S. PATENT DOCUMENTS

| | | | | |
|---|---|---|---|---|
| 5,259,667 | A * | 11/1993 | Okazaki et al. | 303/173 |
| 5,279,382 | A * | 1/1994 | Iwata | 180/197 |
| 5,286,098 | A * | 2/1994 | Okubo | 303/148 |

(Continued)

FOREIGN PATENT DOCUMENTS

| | | | |
|---|---|---|---|
| GB | 2258894 A * | 2/1993 | |
| JP | 2008033760 A | 2/2008 | |

(Continued)

*Primary Examiner* — Bhavesh V Amin
(74) *Attorney, Agent, or Firm* — Harness, Dickey & Pierce, P.L.C.

(57) ABSTRACT

A mobile robot configured to move on a ground. The mobile robot including a contact angle estimation unit estimating contact angles between wheels of the mobile robot and the ground and uncertainties associated with the contact angles, a traction force estimation unit estimating traction forces applied to the wheels and traction force uncertainties, a normal force estimation unit estimating normal forces applied to the wheels and normal force uncertainties, a friction coefficient estimation unit estimating friction coefficients between the wheels and the ground, a friction coefficient uncertainty estimation unit estimating friction coefficient uncertainties, and a controller determining the maximum friction coefficient from among the friction coefficients such that the maximum friction coefficient has an uncertainty less than a threshold and at a point of time when the torque applied to each of the wheels changes from an increasing state to a decreasing state, among the estimated friction coefficients.

19 Claims, 6 Drawing Sheets

(56) References Cited

U.S. PATENT DOCUMENTS

| | | | |
|---|---|---|---|
| 5,455,497 A * | 10/1995 | Hirose et al. | 318/568.12 |
| 5,726,886 A * | 3/1998 | Yamakado et al. | 701/93 |
| 7,272,474 B1 * | 9/2007 | Stentz et al. | 701/26 |
| 7,822,266 B2 * | 10/2010 | Wellington et al. | 382/154 |
| 8,463,436 B2 * | 6/2013 | Jeong et al. | 700/253 |
| 2001/0029419 A1 * | 10/2001 | Matsumoto et al. | 701/80 |
| 2002/0087251 A1 * | 7/2002 | Kogure et al. | 701/80 |
| 2002/0193931 A1 * | 12/2002 | Walenty et al. | 701/71 |
| 2002/0198646 A1 * | 12/2002 | Bedner et al. | 701/48 |
| 2004/0040758 A1 * | 3/2004 | Shimizu | 180/65.2 |
| 2004/0215385 A1 * | 10/2004 | Aizawa et al. | 701/93 |
| 2004/0236490 A1 * | 11/2004 | Kin | 701/70 |
| 2004/0267492 A1 * | 12/2004 | Kogure et al. | 702/141 |
| 2005/0038589 A1 * | 2/2005 | Shukla | 701/80 |
| 2005/0049774 A1 * | 3/2005 | Kogure | 701/80 |
| 2005/0065699 A1 * | 3/2005 | Bertrand | 701/80 |
| 2005/0067993 A1 * | 3/2005 | Kato et al. | 318/568.12 |
| 2006/0041365 A1 * | 2/2006 | Mori | 701/70 |
| 2008/0262692 A1 * | 10/2008 | Kogure et al. | 701/90 |
| 2009/0055020 A1 * | 2/2009 | Jeong et al. | 700/251 |
| 2010/0082204 A1 * | 4/2010 | Kikuchi et al. | 701/41 |
| 2010/0211256 A1 * | 8/2010 | Takenaka et al. | 701/29 |
| 2011/0130974 A1 * | 6/2011 | Yngve et al. | 702/41 |
| 2012/0083961 A1 * | 4/2012 | Sato et al. | 701/25 |
| 2012/0083963 A1 * | 4/2012 | Sato et al. | 701/25 |
| 2013/0035831 A1 * | 2/2013 | Nozu et al. | 701/69 |

FOREIGN PATENT DOCUMENTS

| | | | |
|---|---|---|---|
| KR | 101163078 B1 | 7/2012 | |
| WO | WO 2007096646 A1 * | 8/2007 | B60G 17/0195 |

* cited by examiner

MOBILE ROBOT HAVING FRICTION COEFFICIENT ESTIMATION FUNCTION AND FRICTION COEFFICIENT ESTIMATION METHOD

CROSS-REFERENCE TO RELATED APPLICATION

This application claims the benefit of Korean Patent Application No. 2013-0080147, filed on Jul. 9, 2013 in the Korean Intellectual Property Office, the disclosure of which is incorporated herein by reference.

BACKGROUND

1. Field

Example embodiments relate to a mobile robot having a function of estimating friction coefficients between the ground and wheels while moving on a complicated 3D terrain and a friction coefficient estimation method.

2. Description of the Related Art

In general, mobile robots are used in various fields due to advances in the development of sensors and controllers for the robot. Examples of mobile robots include household robots, such as cleaning robots and security robots, inspection robots performing various operations in dangerous places or unknown places in place of a human, and reconnaissance robots are used.

To facilitate movement, a mobile robot may recognize the position thereof on a map, plan a path during a path planning process, and pass through a terrain to a target. During the path planning process, the mobile robot may need to determine whether or not the mobile robot may easily traverse through the terrain. Since traversability represents whether or not the mobile robot may pass along a path, path planning may be effectively optimized in consideration of traversability.

Such traversability may be influenced by friction coefficients between the ground and wheels. For example, as a friction coefficient between the ground upon which the mobile robot moves and a wheel increases, traversability may increase, and as the friction coefficient between the ground and the wheel decreases, traversability may decrease. When traversability increases, it is estimated that the mobile robot may easily pass through a terrain, and when traversability decreases, it is estimated that the mobile robot may not easily pass through the terrain. That is, more accurate estimation of movement of the mobile robot may be performed using friction coefficients between the ground and the wheels of the mobile robot.

SUMMARY

Example embodiments provide a mobile robot which may estimate the maximum friction coefficient between the ground of a complicated 3D terrain and wheels and a friction coefficient estimation method.

Additional aspects of the example embodiments will be set forth in part in the description which follows and, in part, will be obvious from the description, or may be learned by practice of the example embodiments.

In accordance with an example embodiment, a mobile robot includes a contact angle estimation unit estimating contact angles between wheels of the mobile robot and a ground and contact angle uncertainties, a traction force estimation unit estimating traction forces applied to the wheels and traction force uncertainties using state variables of the wheels, a normal force estimation unit estimating normal forces applied to the wheels and normal force uncertainties using the contact angles, the contact angle uncertainties, the traction forces, and joint pose information, a friction coefficient estimation unit estimating friction coefficients between the wheels and the ground using the estimated traction forces and the estimated normal forces, a friction coefficient uncertainty estimation unit estimating friction coefficient uncertainties using the traction forces, the traction force uncertainties, the normal forces, the normal force uncertainties, and the friction coefficients, and a controller determining the maximum friction coefficient as a friction coefficient having friction coefficient uncertainty less than a threshold and at a point of time when the torque applied to each of the wheels changes from an increasing state to a decreasing state, from among the friction coefficients estimated through the friction coefficient estimation unit.

In another example embodiment, a friction coefficient estimation method includes estimating contact angles between wheels of a mobile robot and a ground and contact angle uncertainties, detecting joint poses of the mobile robot and state variables of the wheels, estimating traction forces applied to the wheels and traction force uncertainties using the wheel state variables, estimating normal forces applied to the wheels and normal force uncertainties using the contact angles, the contact angle uncertainties, the joint poses, the traction forces, and the traction force uncertainties, estimating friction coefficients between the wheels and the ground using the traction forces and the normal forces, estimating friction coefficient uncertainties using the traction forces, the traction force uncertainties, the normal forces, the normal force uncertainties, and the friction coefficients, and determining the maximum friction coefficient as a friction coefficient having friction coefficient uncertainty less than a threshold and at a point of time when the torque applied to each of the wheels changes from an increasing state to a decreasing state, from among the estimated friction coefficients.

In one or more example embodiments, the mobile robot may include a moving unit configured to move the mobile robot with respect to the ground; and a controller configured to control a rate of acceleration and deceleration of the moving of the mobile robot based on a friction coefficient between the moving unit and the ground.

In one or more example embodiments, the friction coefficient is a maximum friction coefficient and controller is configured to estimate the maximum friction coefficient between the moving unit and the ground by, estimating friction coefficients and uncertainties associated therewith; selecting a plurality of the estimated friction coefficients whose corresponding uncertainties are less than a threshold; and selecting as the maximum friction coefficient the estimated friction coefficient that corresponds to a time when a torque applied to the moving unit changes from an increasing state to a decreasing state.

In one or more example embodiments, the moving unit includes wheels that are configured to transport the mobile robot through rotation of the wheels, and controller is configured to estimate the friction coefficients by, estimating contact angles between the wheels and the ground and uncertainties associated with the contact angles; estimating traction forces applied to the wheels and uncertainties associated with the traction forces using state variables of the wheels; estimating normal forces applied to the wheels and uncertainties associated with the normal forces using the contact angles, the contact angle uncertainties, the traction forces, and joint pose information; and estimating the friction coefficients between the wheels and the ground using the traction forces and the normal forces.

In one or more example embodiments, the controller is configured to estimate the contact angles using one of images acquired through cameras and force information detected by force sensors, and estimate the traction forces by applying the state variables of the wheels to a model of the wheels.

In one or more example embodiments, the state variables indicate at least an inertia, moment, torque, radius and angular velocity of the wheels.

BRIEF DESCRIPTION OF THE DRAWINGS

These and/or other aspects of the example embodiments will become apparent and more readily appreciated from the following description of the embodiments, taken in conjunction with the accompanying drawings of which.

DETAILED DESCRIPTION

Figure 1:
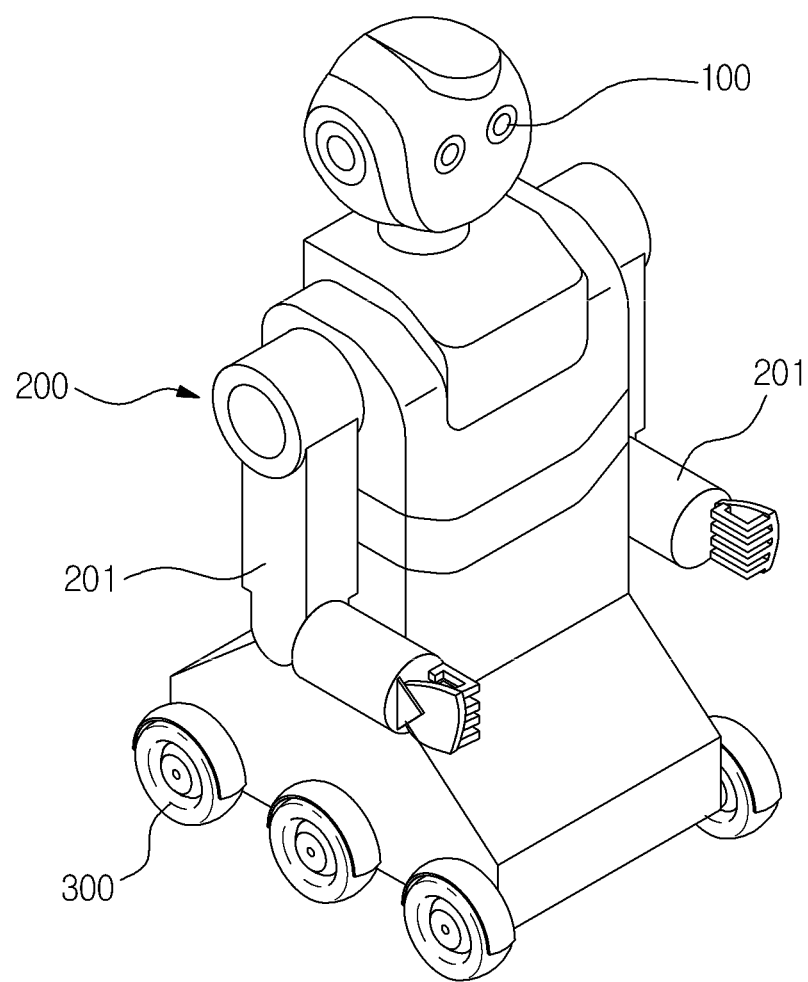
FIG. 1 is a view illustrating an example of the external appearance of a mobile robot according to an example embodiment.

Reference will now be made in detail to embodiments, examples of which are illustrated in the accompanying drawings, wherein like reference numerals refer to like elements throughout. In the drawings, the same or similar elements are denoted by the same reference numerals even though they are depicted in different drawings. In the following description of the example embodiments, a detailed description of known functions and configurations incorporated herein will be omitted when it may make the subject matter rather unclear. In addition, terms in the following description, such as first, second, etc., are used to discriminate one element from other elements, but do not limit such elements.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

In the following description, a wheel-based mobile robot will be described, but example embodiments are not limited thereto.

FIG. 1 is a perspective view illustrating an example of the external appearance of a mobile robot in accordance with an example embodiment.

With reference to FIG. 1, the mobile robot may include an image acquisition unit 100, a main body 200, and moving units 300.

The image acquisition unit 100 acquires images of an external surrounding environment, and may employ cameras in this embodiment. The camera may be a charge coupled device (CCD) camera or a complementary metal-oxide semiconductor (CMOS) camera, but is not limited thereto.

Further, as shown in FIG. 1, manipulators 201, e.g., mechanical arms, may be mounted on the exterior of the main body 200. Although not shown in FIG. 1, a distance sensor may be provided on the exterior of the main body 200. The distance sensor may detect distance information regarding the surrounding environment. The distance sensor may employ an optical sensor, such as an ultrasound sensor, a laser sensor, or an infrared sensor, but is not limited thereto.

The moving units 300 move the mobile robot along a moving path, and may employ wheels but example embodiments are not limited thereto. That is, any device which may move the main body 200 may be used as the moving unit 200.

Hereinafter, the internal configuration of the main body 200 of the mobile robot will be described in detail.

Figure 2:
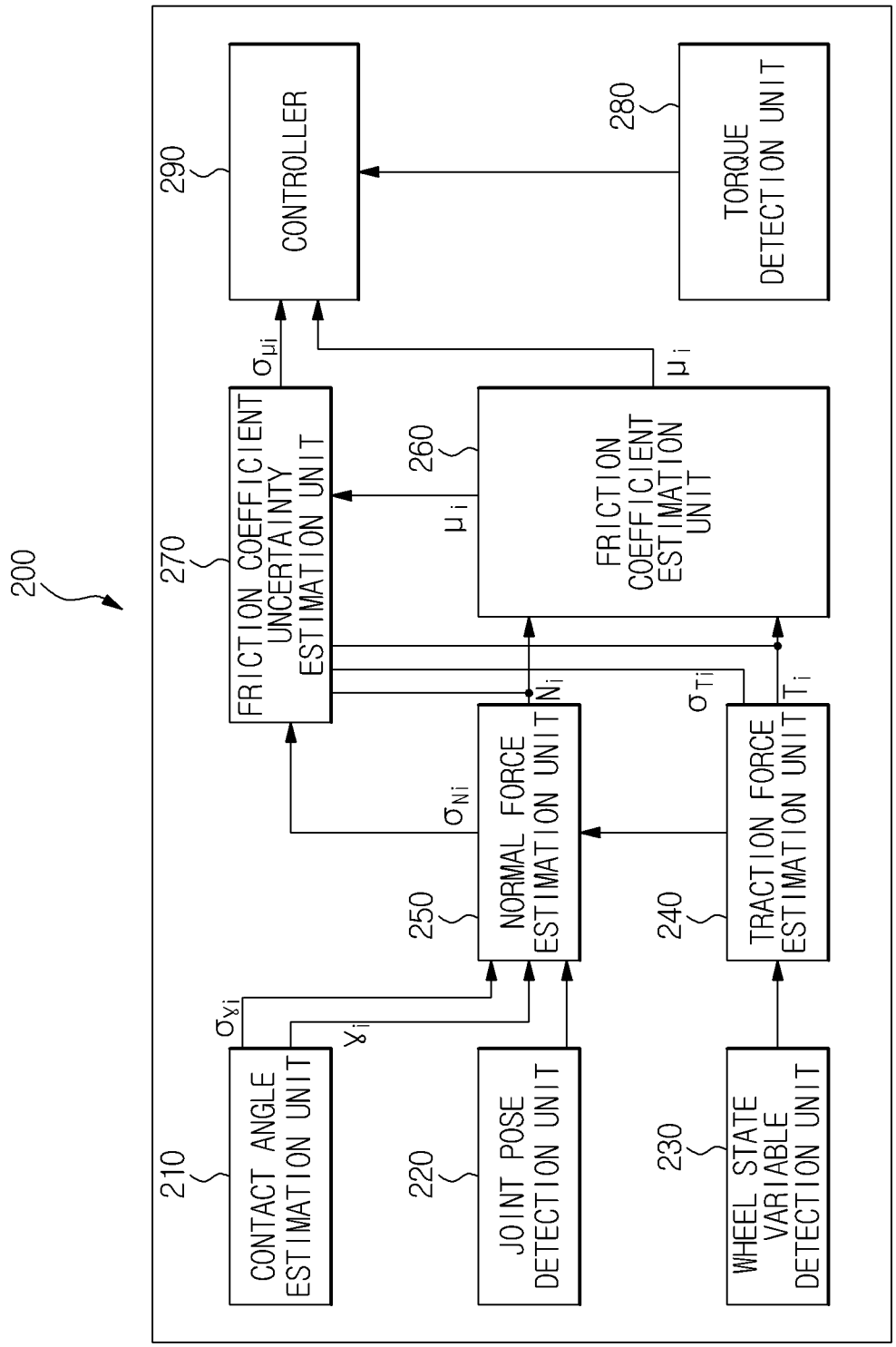
FIG. 2 is a block diagram illustrating an example of the internal configuration of a main body of the mobile robot according to an example embodiment.
Figure 3:
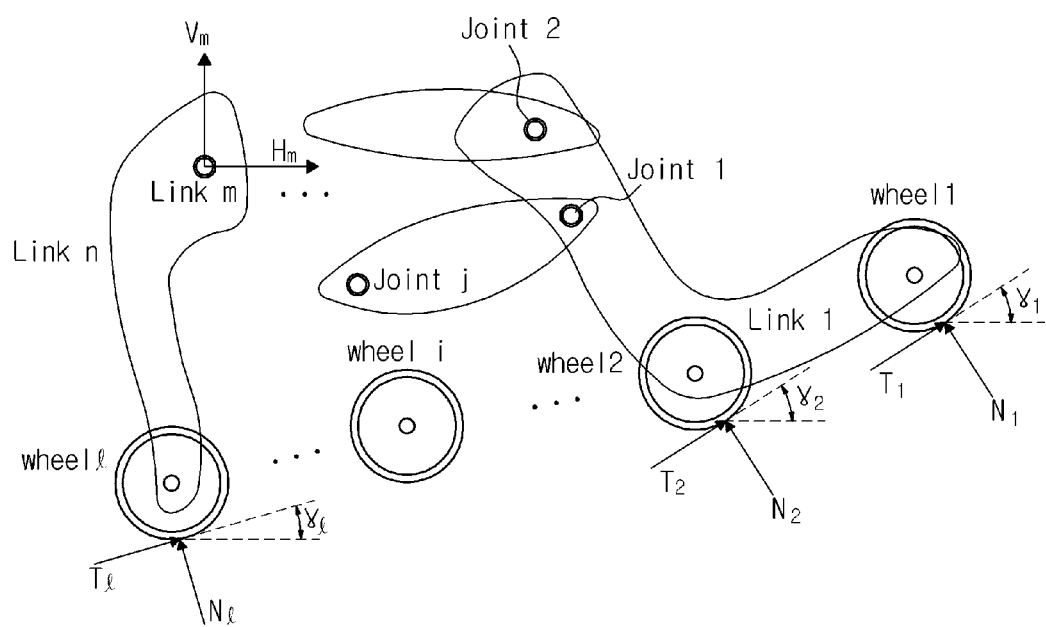
FIG. 3 is a conceptual diagram schematically illustrating an example of the mobile robot having 1 wheels in a 2D structure according to an example embodiment.

FIG. 2 is a block diagram illustrating an example of the internal configuration of the main body of the mobile robot in accordance with an example embodiment and FIG. 3 is a conceptual diagram schematically illustrating an example of the mobile robot having l wheels in a 2D structure according to an example embodiment.

With reference to FIGS. 2 and 3, the mobile robot may include a contact angle estimation unit 210, joint pose detection units 220, wheel state variable detection units 230, a traction force estimation unit 240, a normal force estimation unit 250, a friction coefficient estimation unit 260, a friction coefficient uncertainty estimation unit 270, a torque detection unit 280, and a controller 290.

The contact angle estimation unit 210 estimates contact angles $\gamma_i$ between the moving units 300 of the mobile robot, for example, the wheels 300 of the mobile robot, and the ground upon which the mobile robot moves. The contact angles $\gamma_i$ between the wheels 300 and the ground are illustrated in FIG. 3. The number of contact angles $\gamma_i$ estimated through the contact angle estimation unit 210 may correspond to the number of the wheels 300. Here, subscript i may denote identification numbers of the plural wheels 300. That is, the contact angle $\gamma_i$ may be the contact angle of the $i^{th}$ wheel with the ground.

As illustrated in FIG. 3, the directions of a normal force N and a traction force $T_i$ of the wheel 300 may be determined using the contact angle $\gamma_i$.

The contact angle estimation unit 210 may estimate the contact angle $\gamma_i$ of the wheel 300 using speed information of the wheel 300, an image acquired through a camera mounted on the wheel 300, or force information detected through a force sensor mounted on the wheel 300, but is not limited thereto.

Further, the contact angle estimation unit 210 may estimate an uncertainty $\sigma_{\gamma_i}$ of the contact angle $\gamma_i$ simultaneously with estimation of the contact angle $\gamma_i$.

The contact angle estimation unit 210 may provide the estimated contact angle $\gamma_i$ and the contact angle uncertainty $\sigma_{\gamma_i}$ to the normal force estimation unit 250.

The joint pose detection unit 220 detects pose information of respective joints of the mobile robot. The pose information may include joint angles and joint angular velocities. The joint angles and joint angular velocities detected through the joint pose detection units 220 may be utilized in performing normal force estimation which will be described later.

The joint pose detection unit 220 may be an inclinometer or an inertial measurement unit (IMU), but is not limited thereto. Further, the joint pose detection unit 220 may be provided on plural links as shown in FIG. 3, but is not limited thereto. Thereafter, the joint pose detection unit 220 may provide the detected pose information of the respective joints, e.g., the detected joint angles and joint angular velocities, to the normal force estimation unit 250.

The wheel state variable detection unit 230 may detect state variables of the moving units 300, e.g., the wheels of the mobile robot. The state variables may include torque, angular velocity, radius and inertia moment of the wheel 300. Here, the radius and inertia moment of the wheel 300 may be desired (or alternatively, predetermined) values and the torque and angular velocity of the wheel 300 may be measured through an encoder provided on the wheel 300, but are limited thereto. Thereafter, the state variables including the torque, the angular velocity, the radius and the inertia moment of the wheel 300, detected through the wheel state variable detection unit 230, may be provided to the traction force estimation unit 240.

The traction force estimation unit 240 may estimate the traction force $T_i$ (with reference to FIG. 3) generated during rotation of the wheel of the mobile robot. Traction force $T_i$ may be a propulsive force generated by friction between the wheel 300 and the ground.

The traction force estimation unit 240 may estimate traction force using the state variables of the wheel 300 detected through the above-described wheel state variable detection unit 230. This will be described using equations laid out below.

Figure 4:
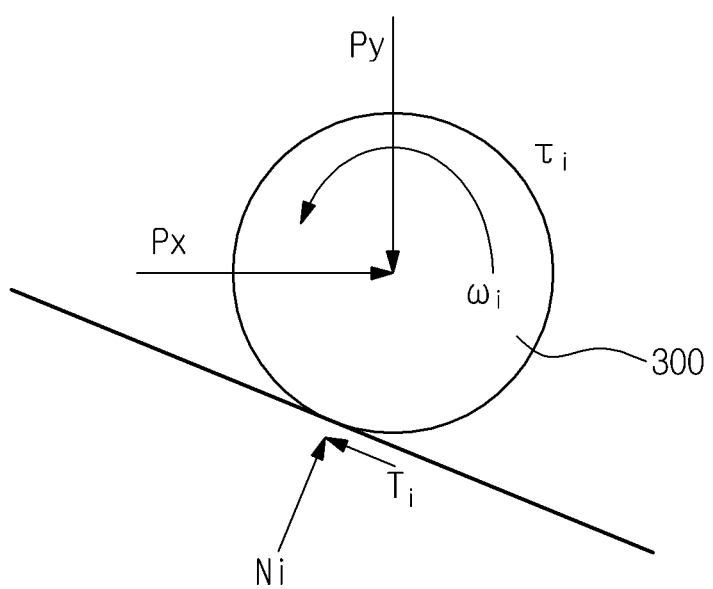
FIG. 4 is a conceptual diagram illustrating single wheel modeling of the mobile robot according to an example embodiment.

FIG. 4 is a conceptual diagram illustrating single wheel modeling of the mobile robot according to an example embodiment.

As illustrated in FIG. 4, the motion of a wheel 300 may be modeled through a motion equation, e.g. Equation 1. e.g. The motion equation, e.g., Equation 1, may be calculated by modeling the wheel 300 to which the normal force is applied in a direction $N_i$, traction force is applied in a direction $T_i$, and a torque of $\tau_i$ is provided, and which is rotated at an angular velocity of $\omega_i$.

$$J_i \dot{\omega}_i = \tau_i - rT_i - B_i \omega_i, \quad T_i \leq \mu_s N_i \qquad \text{(Equation 1)}$$

In equation 1, $J_i$ denotes inertial moment of the wheel, $T_i$ denotes traction force of the wheel, $B_i$ denotes an internal damping coefficient of the wheel, r denotes a radius of the wheel, $\tau_i$ denotes torque (force) applied to the wheel, $\omega_i$ denotes an angular velocity of the wheel, and $\mu_s$ denotes the maximum friction coefficient. Further, subscript i denotes the identification number of each wheel, and subscript l denotes the number of the wheels of the mobile robot.

Since the motion equation regarding rotation of a single wheel 300 does not relate to normal force $N_i$ serving as a wheel axis, Equation 2 may be calculated.

$$\hat{T}_i = \frac{\omega_C}{r(s + \omega_C)} [\tau_i - (J_i s + B_i)\omega_i] \qquad \text{(Equation 2)}$$

Here $\hat{T}_i$ denotes estimated traction force and $\omega_C$ denotes the pole of an observer.

As described above, the traction force estimation unit 240 in accordance with this embodiment may estimate traction force of each wheel using Equation 1 and Equation 2 above and the detected torque, angular velocity, radius and inertia moment of the wheel.

Further, although not stated as equations, the traction force estimation unit 240 may estimate an uncertainty $\sigma_{T_i}$ of the estimated traction force $T_i$. Thereafter, the traction force estimation unit 240 may provide the estimated traction force $T_i$ to the normal force estimation unit 250, the friction coefficient estimation unit 260, and the friction coefficient uncertainty estimation unit 270, and provide the estimated uncertainty $\sigma_{T_i}$ of the traction force $T_i$ to the normal force estimation unit 250 and the friction coefficient uncertainty estimation unit 270.

Referring back to FIGS. 2 and 3, the normal force estimation unit 250 estimates the normal force $N_i$ (with reference to FIG. 3) applied from the ground upon which the mobile robot travels to the wheel of the mobile robot in the vertical direction e.g. The normal force estimation unit 250 may estimate the normal force $N_i$ applied from the ground to the wheel using the contact angle $\gamma_i$ between the wheel 300 of the mobile robot and the ground, estimated through the contact angle estimation unit 210, and joint pose information detected through the joint pose detection unit 220, e.g., the joint angles and joint angular velocities.

The normal force $N_i$ is a component of force applied from a surface which an object contacts to the object, which is vertical to the surface. In brief, the normal force $N_i$ may mean force at which the surface which an object contacts pushes the object in the direction vertical to the surface. For example, in case of an object in a stopped state placed on a flat ground, the normal force $N_i$ applied in the opposite direction of gravity applied to the object and having the same intensity as the gravity cancels the gravity, thus preventing the object from coming down from the ground toward the earth's center.

The normal force $N_i$ may be estimated by forming a quasi-static equilibrium equation using the traction force $T_i$ of the wheel estimated through the traction force estimation unit 240, the contact angle $\gamma_i$ between the wheel 300 and the ground estimated through the contact angle estimation unit 21, the joint angles and joint angular velocities of the mobile robot detected through the joint pose detection unit 220, and the mobile robot model, and calculating a least-squares solution of the formed quasi-static equilibrium equation. This will be described using equations below.

First, a quasi-static equilibrium equation, e.g., Equation 3, may be formed using the joint angles and joint angular velocities of the mobile robot and the mobile robot model.

$$\begin{bmatrix} a_1 & c_1 & d_1 & e_1 \\ a_2 & c_2 & d_2 & e_2 \\ \vdots & \vdots & \vdots & \vdots \\ a_{3n} & c_{3n} & d_{3n} & 3_{3n} \end{bmatrix} \begin{bmatrix} X_N \\ X_V \\ X_H \\ X_A \end{bmatrix} = \begin{bmatrix} f_1 - b_1 X_T \\ f_2 - b_2 X_T \\ \vdots \\ f_3 - b_{3n} X_T \end{bmatrix} \quad \text{(Equation 3)}$$

In equation 3, $a_1, a_2, \ldots, a_{3n}$ and are coefficients representing contact angles, joint angles, or joint angular velocities, $c_1, c_2, \ldots, c_{3n}, d_1, d_2, \ldots, d_{3n}$, and $e_1, e_2, \ldots, e_{3n}$ are coefficients having values of 0, −1, or 1, and $f_1, f_2, \ldots, f_{3n}$ represent force applied to links by gravity.

Further, $X_N$ denotes normal force applied to the wheel, $X_V$ denotes internal force applied to a joint in the vertical direction, $X_H$ denotes internal force applied to the joint in the horizontal direction, $X_A$ denotes joint torque, and $X_T$ denotes traction force of the wheel.

Equation 3 above may be simplified into Equation 4 below.

$$GX = F - BX_T \quad \text{(Equation 4)}$$

In Equation 4, G denotes a matrix $$\begin{bmatrix} a_1 & c_1 & d_1 & e_1 \\ a_2 & c_2 & d_2 & e_2 \\ \vdots & \vdots & \vdots & \vdots \\ a_{3n} & c_{3n} & d_{3n} & 3_{3n} \end{bmatrix}$$

representing the pose of the mobile robot, F denotes a matrix $[f_1\ f_2\ \ldots\ f_{3n}]^T$ representing the force applied to the links by gravity, and B denotes a matrix $[b_1^T\ b_2^T\ b_{3n}^T]^T$ representing contact angles, joint angles or joint angular velocities.

A least-squares solution of Equation 4 may be calculated as shown in equation 5.

$$X = G^*(F - BX_T) \quad \text{(Equation 5)}$$

In equation 5, $G^*$ is a pseudo-inverse of G corresponding to:

$$G^* = G^T(GG^T)^{-1}$$

Further, X in Equation 5 includes the normal force $X_N$, the internal force $X_V$ in the vertical direction, the internal force $X_H$ in the horizontal direction, and the joint torque $X_A$, stated in Equation 3. Therefore, the normal force estimation unit 250 may estimate normal force $N_i$ applied to each wheel through Equation 5.

Further, the normal force estimation unit 250 may estimate a normal force uncertainty $\sigma_{N_i}$. This will be described using equations 6-8 below.

Equation 4 above may be rewritten in terms of the force F applied to the links by gravity as Equation 6 below.

$$F = GX + BX_T \quad \text{(Equation 6)}$$

Next, Equation 6 may be linearized as Equation 7 below.

$$\overline{G}X \neq -\hat{A}(\gamma - \hat{\gamma}) - \overline{B}X_T + F \quad \text{(Equation 7)}$$

In equation 7, $\overline{A}$ is defined for convenience of calculation, and is expressed as below.

$$\overline{A} \triangleq \left( \frac{\partial G}{\partial \gamma_1}\overline{X} + \frac{\partial B}{\partial \gamma_1}\overline{X}_T \left| \frac{\partial G}{\partial \gamma_2}\overline{X} + \frac{\partial B}{\partial \gamma_2}\overline{X}_T \right| \ldots \left| \frac{\partial G}{\partial \gamma_l}\overline{X} + \frac{\partial B}{\partial \gamma_l}\overline{X}_T \right. \right)$$

Thereafter, a covariance matrix of $\overline{G}X$ may be calculated as Equation 8 below.

$$\Sigma_X = \overline{G}^{}(\overline{A}\Sigma_\gamma \overline{A}^T + \overline{B}\Sigma_{X_T}\overline{B}^T)\overline{G}^{T} \quad \text{(Equation 8)}$$

Here, $\Sigma_\gamma$ and $\Sigma_{X_T}$ denote a covariance matrix of the contact angle and a covariance matrix of the traction force. X in $\Sigma_X$ includes the normal force $X_N$, the internal force $X_V$ in the vertical direction, the internal force $X_H$ in the horizontal direction, and the joint torque $X_A$. Therefore, $\Sigma_X$ may include a covariance matrix of the normal force, a covariance matrix of the internal force $X_V$ in the vertical direction, a covariance matrix of the internal force in the horizontal direction $X_H$, and a covariance matrix of the joint torque $X_A$. The covariance matrices may represent uncertainty.

As described above, the normal force estimation unit 240 may estimate uncertainty $\sigma_{N_i}$ of the normal force through Equation 8, provide the estimated normal force $N_i$ to the friction coefficient estimation unit 260 and the friction coefficient uncertainty estimation unit 270, and provide the estimated normal force uncertainty $\sigma_{N_i}$ to the friction coefficient uncertainty estimation unit 270.

The friction coefficient estimation unit 260 receives the traction force $T_i$ estimated through the traction force estimation unit 240 and the normal force $N_i$ estimated through the normal force estimation unit 250, and estimates a friction coefficient $\mu_i$.

In general, the friction coefficient $\mu_i$ is a value providing proportional relations between normal force $N_i$ and traction force $T_i$, and may mean a degree of friction between two contacting surfaces. Traction force $T_i$ is generally proportional to normal force $N_i$ and at this time, a proportional constant is the frictional coefficient $\mu_i$. Relations between the traction force $T_i$ and the normal force $N_i$ may be expressed as Equation 9 below.

$$T_i = \mu_i N_i \quad \text{(Equation 9)}$$

That is, the friction coefficient estimation unit 260 may estimate a friction coefficient $\mu_i$ by applying the traction force $T_i$ estimated through the traction force estimation unit 240 and the normal force $N_i$ estimated through the normal force estimation unit 250 to Equation 9. Further, the friction coefficient estimation unit 260 may provide the estimated friction coefficient $\mu_i$ to the friction coefficient uncertainty estimation unit 270 and the controller 290.

The friction coefficient uncertainty estimation unit 270 estimates uncertainty $\sigma_{\mu_i}$ of the friction coefficient $\mu_i$ estimated by the friction coefficient estimation unit 260. The friction coefficient uncertainty estimation unit 270 receives the traction force $T_i$ and the traction force uncertainty $\sigma_{T_i}$ estimated through the traction force estimation unit 240, the normal force $N_i$ and the normal force uncertainty $\sigma_{N_i}$ estimated through the normal force estimation unit 250, and the friction coefficient $\mu_i$ estimated through the friction coefficient estimation unit 260, and estimates the friction coefficient uncertainty $\sigma_{\mu_i}$ using equation 10.

$$\left(\frac{\sigma_{\mu_i}}{\mu_i}\right)^2 = \left(\frac{\sigma_{T_i}}{T_i}\right)^2 + \left(\frac{\sigma_{N_i}}{N_i}\right)^2 \quad \text{(Equation 10)}$$

In equation 10, $T_i$, $\sigma_{T_i}$, $N_i$, $\sigma_{N_i}$, and $\mu_i$ may be provided from the traction force estimation unit 240, the normal force estimation unit 250, and the friction coefficient estimation unit 260, as described above. Therefore, the friction coefficient uncertainty $\sigma_{\mu_i}$ be estimated by applying these values to Equation 10. The friction coefficient uncertainty estimation unit 270 may provide the estimated friction coefficient uncertainty $\sigma_{\mu_i}$ to the controller 290.

The torque detection unit 280 detects the torque $\tau_i$ applied to the wheel 300.

In general, the torque $\tau_i$ applied to the wheel 300 is increased until a desired (or alternatively, a predetermined) threshold angular acceleration is detected and, when the threshold angular acceleration is detected, it is recognized that the applied torque $\tau_i$ is greater than torque due to the maximum friction force and the torque $\tau_i$ applied to the wheel 300 is gradually decreased. Thereafter, when the velocity of the wheel 300 is greatly decreased and the detected angular acceleration is less than a predetermined negative value, the torque $\tau_i$ applied to the wheel 300 is gradually increased again.

Thereby, a process of increasing and decreasing the torque $\tau_i$ applied to the wheel 300 to sense the maximum friction force is repeated, and the torque detection unit 280 may detect points of time when the torque $\tau_i$ is increased and decreased and provide the detected points of time to the controller 290.

The controller 290 determines the maximum friction coefficient between the wheel 300 and the ground using the estimated friction coefficient $\mu_i$ provided from the friction coefficient estimation unit 260, the estimated friction coefficient uncertainty $\sigma_{\mu_i}$ provided from the friction coefficient uncertainty estimation unit 270, and the torque information $\tau_i$ detected through the torque detection unit 280.

The estimated uncertainty $\sigma_{\mu_i}$ of the friction coefficient provided from the friction coefficient uncertainty estimation unit 270 may mean estimated uncertainty of the estimated friction coefficient $\mu_i$. Further, the torque information detected through the torque detection unit 280 may mean information regarding a point of time when the torque $\tau_i$ applied to the wheel 300 changes from the increasing state to the decreasing state.

The controller 290 of the mobile robot may select friction coefficients from the estimated friction coefficients $\mu_i$ provided from the friction coefficient estimation unit 260 whose associated uncertainties $\sigma_{\mu_i}$ are less than a desired (or alternatively, a predetermined) threshold, and set the maximum friction coefficient as a friction coefficient corresponding to the point of time when the torque applied to the wheel 300 changes from the increasing state to the decreasing state, from among the selected friction coefficients. Here, the above-described threshold may be properly set by an operator.

Figure 5:
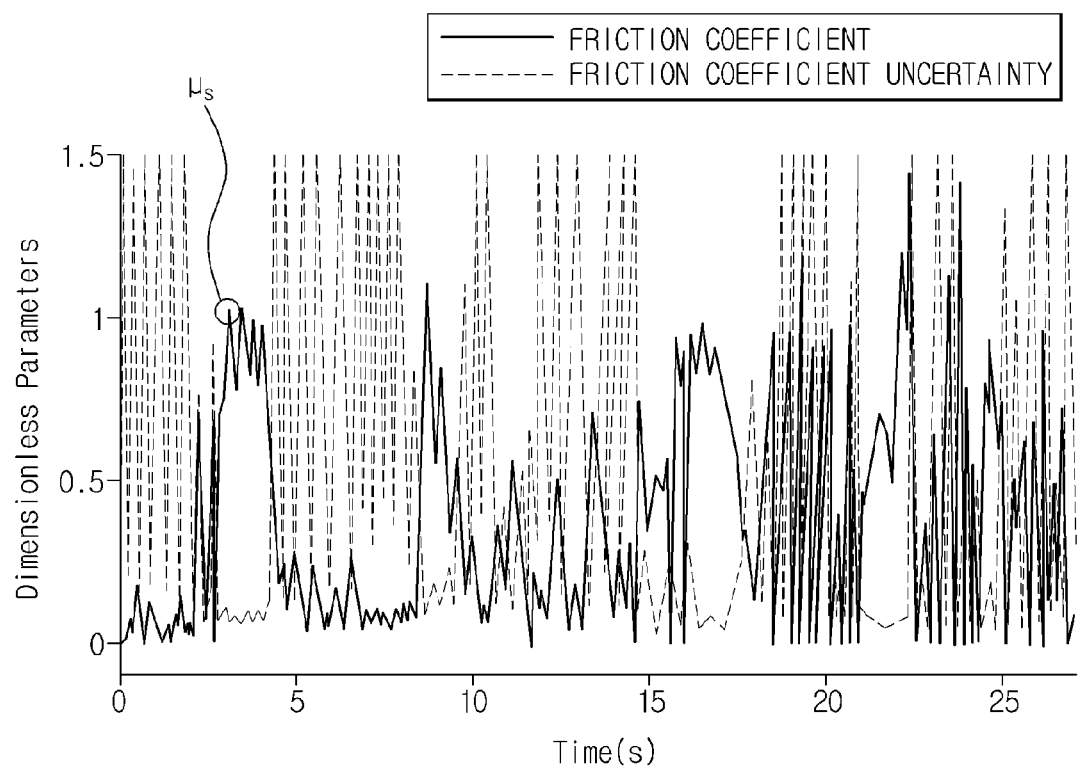
FIG. 5 is a graph illustrating relations between estimated friction coefficients and friction coefficient uncertainties.

FIG. 5 is a graph representing relations among the set maximum friction coefficient $\mu_s$, the estimated friction coefficients (a solid line), and the friction coefficient uncertainties (a dotted line).

Hereinafter, a friction coefficient estimation method performed in the mobile robot according to an example embodiment will be described.

Figure 6:
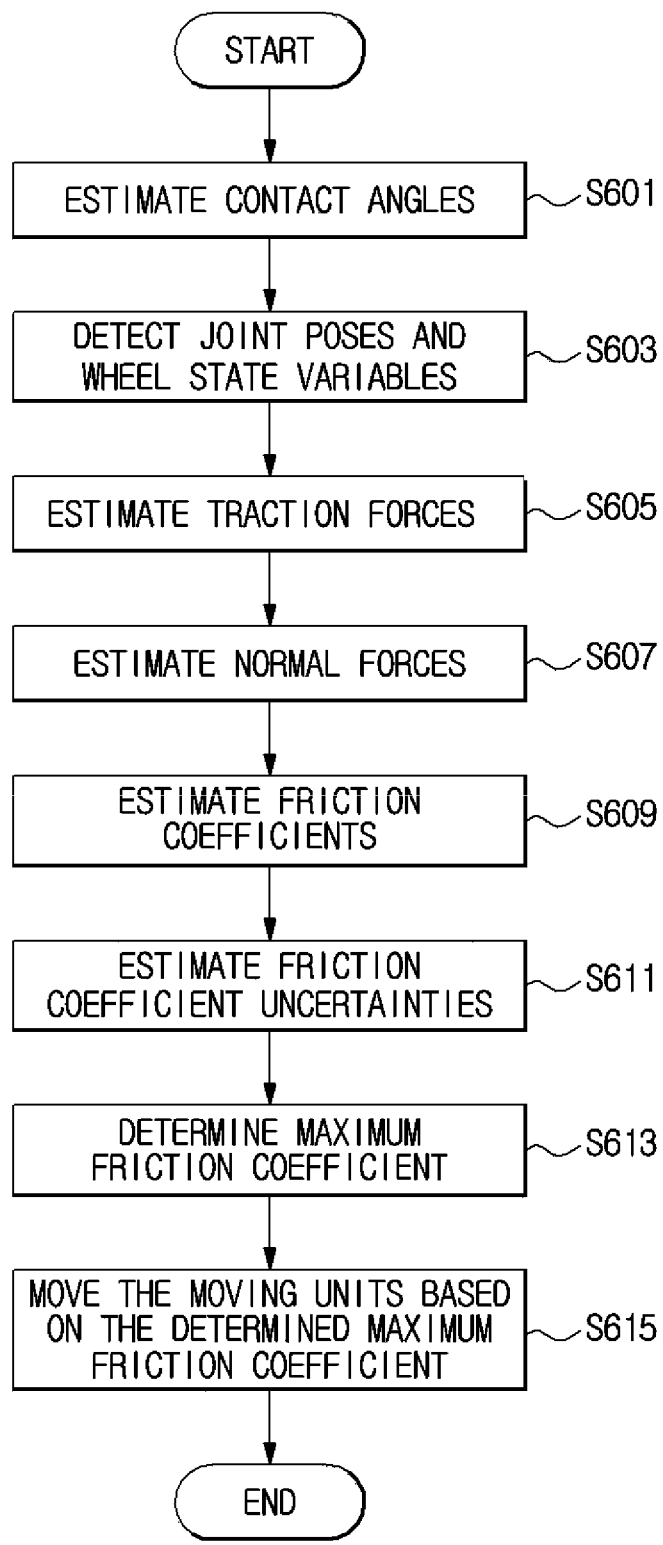
FIG. 6 is a flowchart sequentially illustrating an example of a friction coefficient estimation method according to an example embodiment.

FIG. 6 is a flowchart sequentially illustrating an example of a friction coefficient estimation method in accordance with an example embodiment.

Referring to FIGS. 2 and 6, the contact angle estimation unit 210 may estimate the contact angles $\gamma_i$ between wheels 300 of the mobile robot and the ground (Operation S601). The contact angle estimation unit 210 may estimate contact angle uncertainties $\sigma_{\gamma_i}$ simultaneously with the contact angles $\gamma_i$.

The contact angle estimation unit may perform operation 601 using images acquired by cameras provided on the wheels 300 or force information detected by force sensors provided on the wheels 300, but is not limited thereto.

The joint pose detection units 220 and the wheel state variable detection units 230 detect joint pose information of the mobile robot and state variables of the wheels 300 (Operation S603). The joint pose information may include joint angles and joint angular velocities and the wheel state variables may include inertia moments, torques, radiuses and angular velocities of the wheels 300, but are not limited thereto.

The joint pose detection units 220 may detect the joint angles and joint angular velocities using inclinometers or inertial measurement units (IMU) provided on links of the mobile robot, but are not limited thereto. Further, among the wheel state variables, the inertia moments and radiuses of the wheels 300 may be predetermined, and the torques and angular velocities of the wheels 300 may be detected using encoders provided on the wheels 300.

The traction force estimation unit 240 estimates traction forces $T_i$ applied to the wheels 300 using the state variables of the wheels 300 detected through Operation S603, e.g., the inertia moments, torques, radiuses and angular velocities of the wheels 300 (Operation S605). Estimation of the traction forces $T_i$ may be performed using equations, and the process of estimating the traction forces $T_i$ using equations has been described above and a detailed description thereof will thus be omitted. Traction force uncertainties $\sigma_{T_i}$ may be estimated simultaneously with estimation of the traction forces $T_i$.

Thereafter, the normal force estimation unit 250 estimates normal forces $N_i$ applied to the wheels 300 using the contact angles estimated through Operation S601, and the joint angles and joint angular velocities detected through Operation 603 (Operation S607). The normal force estimation unit 250 may estimate the normal forces $N_i$ using equations 3 to 5.

In this operation, normal force uncertainties $\sigma_{N_i}$ may be estimated simultaneously with estimation of the normal forces $N_i$. In order to estimate normal force uncertainties $\sigma_{N_i}$, the contact angle uncertainties $\sigma_{\gamma_i}$ and the traction force uncertainties $\sigma_{T_i}$ respectively estimated through Operation S601 and Operation S605 may be used. The normal force estimation unit 250 may estimation of the normal force uncertainties $\sigma_{N_i}$ using equations 6 to 8.

The friction coefficient estimation unit 260 estimates friction coefficients $\mu_i$ between the wheels 300 and the ground using the traction forces $T_i$ and the normal forces $N_i$ respectively estimated through Operation S605 and Operation S607 (Operation S609).

The friction coefficient uncertainty estimation unit 270 estimates friction coefficient uncertainties $\sigma_{\mu_i}$ using the traction forces $T_i$, the traction force uncertainties $\sigma_{T_i}$, the normal forces $N_i$, and the normal force uncertainties $\sigma_{N_i}$, estimated through Operation S605 and Operation S607, and the friction coefficients $\mu_i$ estimated through Operation 609 (Operation S611).

Thereafter, the controller 290 selects friction coefficients $\mu_i$ having friction coefficient uncertainties $\mu_{\mu_i}$ which are less than a desired (or alternatively, a predetermined) threshold, from among the friction coefficients $\mu_i$ estimated through Operation 609, and sets the maximum friction coefficient $\mu_s$ as a friction coefficient $\mu_i$ corresponding to a point of time when the torque applied to the wheel 300 changes from the increasing state to the decreasing state, from among the selected friction coefficients $\mu_i$ (Operation S613).

After setting the maximum friction coefficient $\mu_s$, the controller give driving instructions to a driver to move the moving units 300 based on the maximum friction coefficient $\mu_s$, thus improving motion safety and traction force control performance (Operation S615).

The mobile robot may detect characteristics of the ground by estimating friction coefficients between wheels of the mobile robot and the ground upon which the mobile robot travels, so as to be used in ground classification, and give driving instructions in consideration of the detected ground characteristics, thus improving motion safety and traction force control performance and predicting traversability.

For example, if it is estimated that a friction coefficient is low, the ground may be determined to be slippery. Therefore, the mobile robot may accelerate and decelerate so as to improve motion safety, and characteristics of the ground may be detected and thus traversability of the mobile robot on the ground may be predicted.

Further, the mobile robot may estimate the friction coefficients $\mu_i$ using values measured by sensors provided on the mobile robot, and, therefore, may not require a separate device to measure the friction coefficients $\mu_i$, thus being effective in terms of cost as well as preventing complication of the structure of the mobile robot.

In the above-described example embodiments, some of the elements of the main body of the mobile robot may be implemented as a 'module'. The 'module' may be software-based components or hardware components, such as a one or more Central Processing Units (CPUs), digital signal processors (DSPs), field programmable gate array (FPGA) or an application specific integrated circuit (ASIC), and the module may perform certain functions. However, the module is not limited to software or hardware. The module may be configured so as to be placed in a storage medium which may perform addressing, or to execute one or more processors.

For example, the modules may include components such as software components, object-oriented software components, class components, and task components, processes, functions, attributes, procedures, subroutines, segments of program codes, drivers, firmware, microcodes, circuits, data, databases, data structures, tables, arrays, and variables. Functions provided from the components and the modules may be combined into a smaller number of components and modules, or be separated into additional components and modules. Moreover, the components and the modules may execute one or more CPUs.

Some of the example embodiments may be implemented through a non-transitory medium including computer readable codes/instructions to control at least one processing element of the above-described embodiment, for example, a computer readable medium. Such a medium may correspond to a medium/media which may store and/or transmit the computer readable codes.

The computer readable codes may be recorded in a medium or be transmitted over the Internet. For example, the medium may include a ROM, a RAM, a CD-ROM, a magnetic tape, a floppy disc, an optical recording medium, or a carrier wave such as data transmission over the Internet. Further, the medium may be a non-transitory computer readable medium. Since the medium may be a distributed network, the computer readable code may be stored, transmitted and executed in a distributed manner. Further, for example, the processing element may include a processor or a computer processor, and be distributed and/or included in one device.

Although a few example embodiments have been shown and described, it would be appreciated by those skilled in the art that changes may be made in these example embodiments without departing from the principles and spirit of the example embodiments, the scope of which is defined in the claims and their equivalents.

What is claimed is:

1. A mobile robot configured to move on a ground, the mobile robot comprising:
    a contact angle estimation unit configured to estimate contact angles between wheels of the mobile robot and the ground and uncertainties associated with the contact angles;
    a traction force estimation unit configured to estimate traction forces applied to the wheels and uncertainties associated with the traction forces using state variables of the wheels;
    a normal force estimation unit configured to estimate normal forces applied to the wheels and uncertainties associated with the normal forces using the contact angles, the contact angle uncertainties, the traction forces, and joint pose information;
    a friction coefficient estimation unit configured to estimate friction coefficients between the wheels and the ground using the traction forces and the normal forces;
    a friction coefficient uncertainty estimation unit configured to estimate uncertainties of the friction coefficients using the traction forces, the traction force uncertainties, the normal forces, the normal force uncertainties, and the friction coefficients; and
    a controller configured to determine a maximum friction coefficient from among the friction coefficients such that the maximum friction coefficient has an associated one of the friction coefficient uncertainties that is less than a threshold and at a point of time when the torque applied to the wheels changes from an increasing state to a decreasing state.

2. The mobile robot according to claim 1, further comprising:
    joint pose detection units configured to detect the joint pose information; and
    wheel state variable detection units configured to detect the state information of the wheels.

3. The mobile robot according to claim 2, wherein the joint pose detection units are inclinometers or inertial measurement units (IMU).

4. The mobile robot according to claim 2, wherein the wheel state variable detection units include encoders.

5. The mobile robot according to claim 1, wherein the joint pose information includes joint angles and joint angular velocities.

6. The mobile robot according to claim 1, wherein the state information of the wheels includes the torques applied to the wheels, angular velocities, radiuses and inertia moments of the wheels.

7. The mobile robot according to claim 1, wherein the traction force estimation unit is configured to estimate the traction forces by applying the detected wheel state variables to a model of the wheels.

8. The mobile robot according to claim 1, wherein the normal force estimation unit is configured to estimate the normal forces by,
forming a quasi-static equilibrium equation using the traction forces, the contact angles, the joint angles, the angular velocities, and a mobile robot model; and
calculating a least-squares solution of the formed quasi-static equilibrium equation.

9. The mobile robot according to claim 1, wherein the contact angle estimation unit is configured to estimate the contact angles and the contact angle uncertainties using images acquired through cameras mounted on the wheels.

10. The mobile robot according to claim 1, wherein the contact angle estimation unit is configured to estimate the contact angles and the contact angle uncertainties using force information detected through force sensors mounted on the wheels.

11. A friction coefficient estimation method comprising:
estimating contact angles between wheels of a mobile robot and a ground and uncertainties associated with the contact angles;
detecting joint poses of the mobile robot and state variables of the wheels;
estimating traction forces applied to the wheels using the state variables of the wheels;
estimating uncertainties associated with the traction forces;
estimating normal forces applied to the wheels using the contact angles, the contact angle uncertainties, the joint poses, the traction forces, and the traction force uncertainties;
estimating uncertainties associated with the normal forces;
estimating friction coefficients between the wheels and the ground using the traction forces and the normal forces;
estimating uncertainties associated with the friction coefficients using the traction forces, the traction force uncertainties, the normal forces, the normal force uncertainties, and the friction coefficients; and
determining a maximum friction coefficient from among the friction coefficients such that the maximum friction coefficient has an associated one of the friction coefficient uncertainties that is less than a threshold and at a point of time when the torque applied to the wheels changes from an increasing state to a decreasing state.

12. The friction coefficient estimation method according to claim 11, wherein the estimating contact angles and the contact angle uncertainties is performed using images acquired through cameras mounted on the wheels.

13. The friction coefficient estimation method according to claim 11, wherein the estimating contact angles and the contact angle uncertainties is performed using force information detected through force sensors mounted on the wheels.

14. The friction coefficient estimation method according to claim 11, wherein the estimating traction forces is performed by applying the state variables of the wheels to a model of the wheels.

15. The friction coefficient estimation method according to claim 11, wherein the estimating normal forces is performed by,
forming a quasi-static equilibrium equation using the traction forces, the contact angles, the joint angles, the angular velocities, and a mobile robot model; and
calculating a least-squares solution of the formed quasi-static equilibrium equation.

16. A mobile robot configured to move on a ground, the mobile robot comprising:
a moving unit configured to move the mobile robot with respect to the ground, the moving unit including wheels that are configured to transport the mobile robot through rotation thereof; and
a controller configured to control a rate of acceleration and deceleration of the moving of the mobile robot based on a maximum friction coefficient between the wheels and the ground by,
estimating friction coefficients between the wheels and the ground and uncertainties associated therewith based on estimated traction forces and normal forces applied to the wheels,
selecting a plurality of the estimated friction coefficients whose corresponding uncertainties are less than a threshold, and
selecting as the maximum friction coefficient the estimated friction coefficient that corresponds to a time when a torque applied to the wheels changes from an increasing state to a decreasing state.

17. The mobile robot of claim 16, wherein the controller is configured to estimate the friction coefficients by,
estimating contact angles between the wheels and the ground and uncertainties associated with the contact angles;
estimating the traction forces applied to the wheels and uncertainties associated with the traction forces using state variables of the wheels;
estimating the normal forces applied to the wheels and uncertainties associated with the normal forces using the contact angles, the contact angle uncertainties, the traction forces, and joint pose information; and
estimating the friction coefficients between the wheels and the ground using the traction forces and the normal forces.

18. The mobile robot of claim 17, wherein the controller is configured to,
estimate the contact angles using one of images acquired through cameras and force information detected by force sensors, and
estimate the traction forces by applying the state variables of the wheels to a model of the wheels.

19. The mobile robot of claim 18, wherein the state variables indicate at least an inertia, moment, torque, radius and angular velocity of the wheels.

* * * * *